T. J. JOYNER.
DITCHING MACHINE.
APPLICATION FILED AUG. 8, 1917.
1,261,031.
Patented Apr. 2, 1918.
2 SHEETS—SHEET 1.
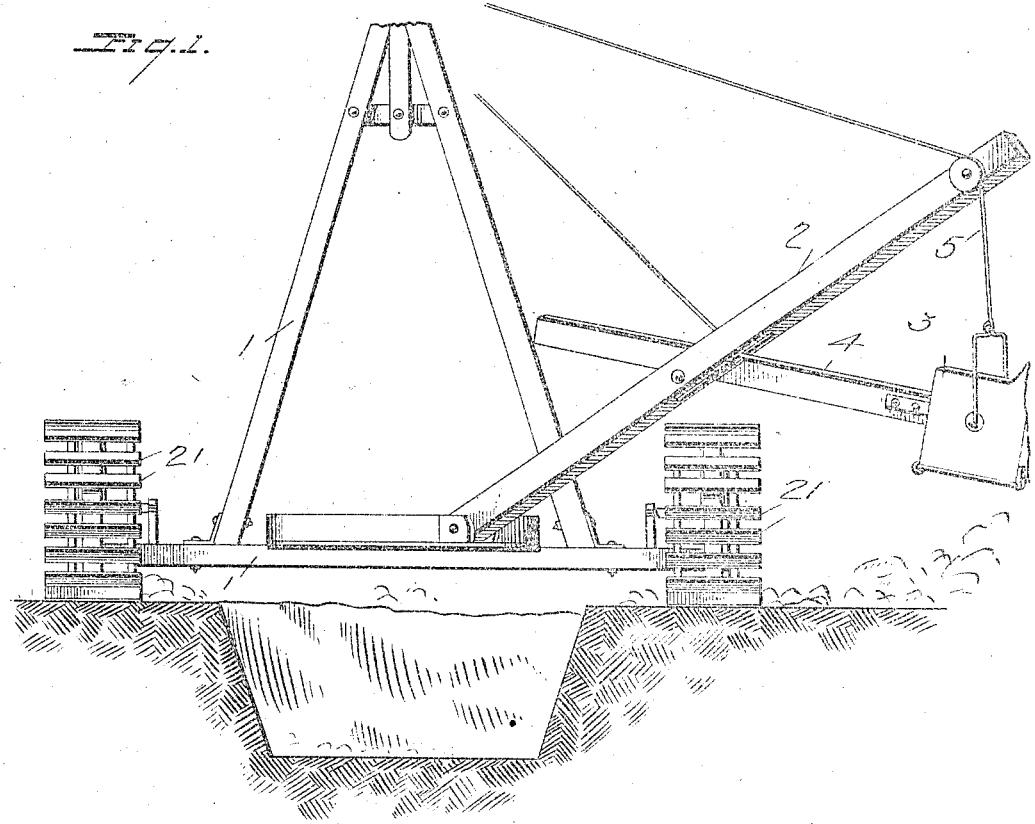
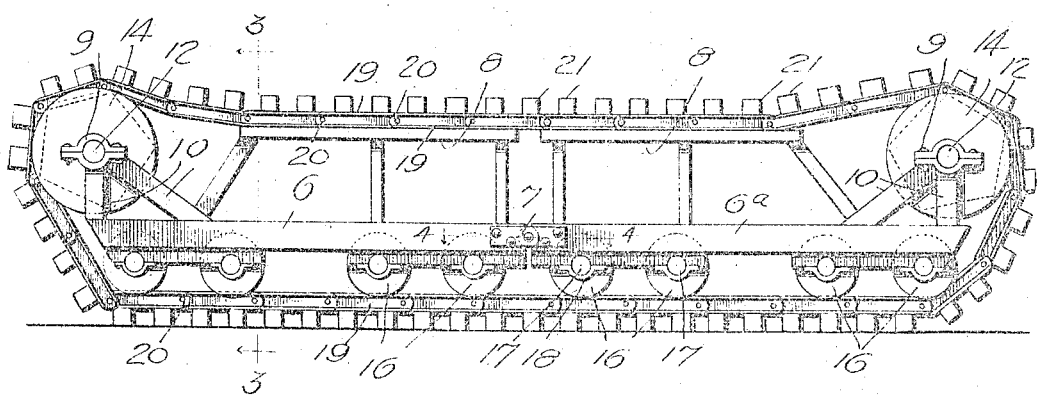
WITNESSES
George C. Myers.
H. J. Bosse
INVENTOR
Thomas J. Joyner
BY
ATTORNEYS

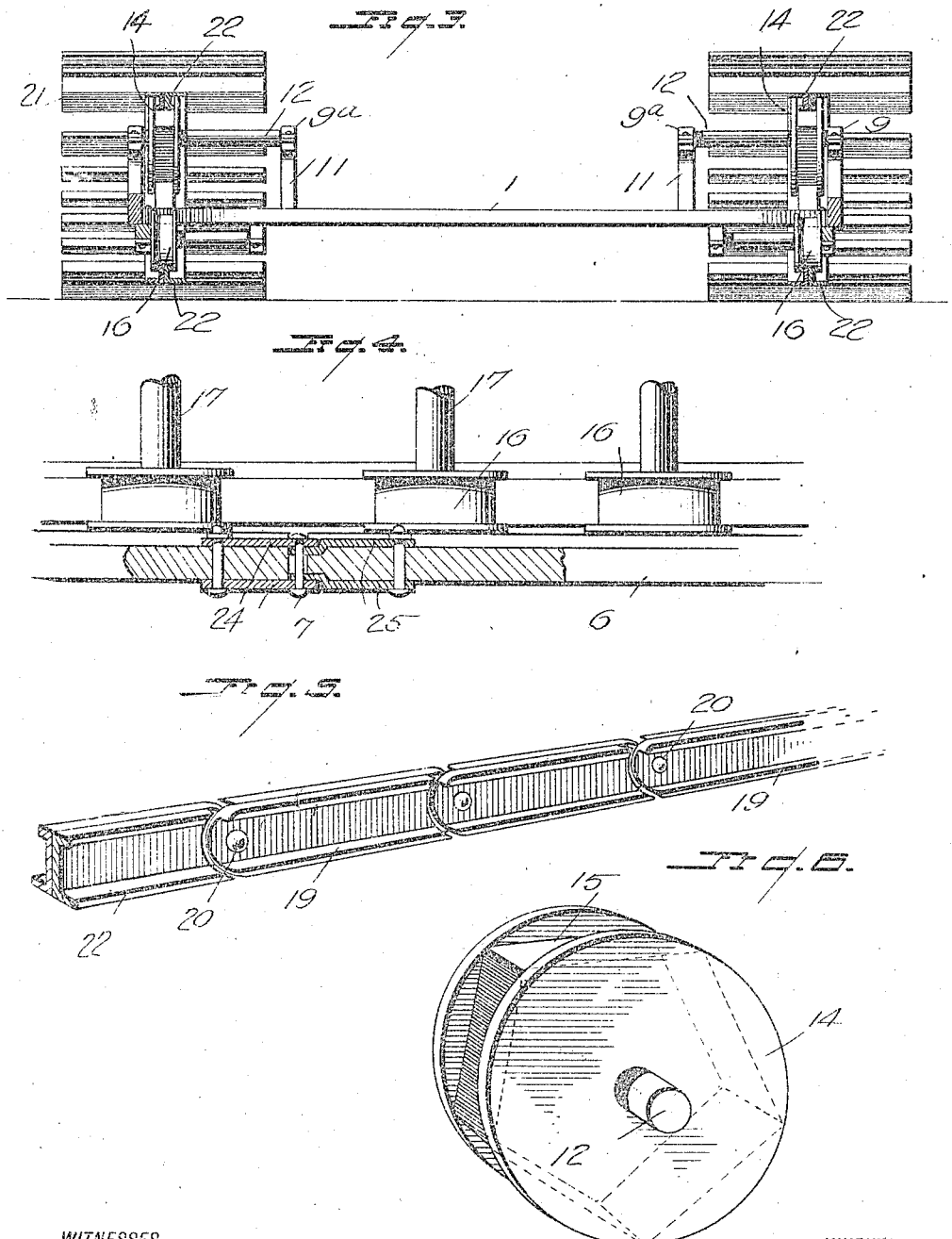

UNITED STATES PATENT OFFICE.

THOMAS JEFFERSON JOYNER, OF ST. CLOUD, MINNESOTA.

DITCHING-MACHINE.

1,261,031.      Specification of Letters Patent.      Patented Apr. 2, 1918.

Application filed August 8, 1917. Serial No. 185,048.

*To all whom it may concern:*

Be it known that I, THOMAS J. JOYNER, a citizen of the United States, and a resident of St. Cloud, in the county of Stearns and State of Minnesota, have invented new and useful Improvements in Ditching-Machines, of which the following is a specification.

My invention is an improvement in ditching machines, and has for its object to provide a new and improved machine of the character specified wherein tracks are provided, mounted on suitable wheels for supporting and laying the same on opposite sides of the ditch to support the ditching machine between the said tracks and wheels.

In the drawings:

Figure 1 is a front view of the improved ditching machine;

Fig. 2 is a side view of one of the track support laying means;

Figs. 3 and 4 are sections on the lines 3—3 and 4—4, respectively, of Fig. 2, looking in the direction of the arrows adjacent the respective lines;

Fig. 5 is a perspective view of a portion of one of the belts;

Fig. 6 is a similar view of one of the supporting wheels.

In the present embodiment of the invention, the ditching machine comprises a suitable frame 1 having a crane 2 to which is connected a scoop or dipper 3 by means of the usual supporting beams 4 and cables 5 for operating the said dipper or scoop. The frame 1 and connected parts are supported at each side of the ditch, as indicated in Fig. 1, by means of suitable trucks, one of which is shown in detail in Fig. 2. Each of these trucks comprises frame sections 6 and 6ª hinged together as indicated at 7, and each truck section carries a superstructure 8 at its inner end and a bearing 9 at its outer end, each bearing being supported by a suitable bracket 10. Another bearing 9ª is journaled at the inner side of each bearing 9 on a bracket 11, and in alinement with the adjacent bearing 9, and a shaft 12 is journaled in each pair of bearings 9—9ª. Each of these shafts 12 carries one of the wheels shown in Fig. 6, and each wheel comprises a pair of disks 14 arranged in spaced relation and connected by a block 15 which is polygonal in cross section, being pentagonal in the present instance.

Each truck 6 and 6ª carries two pairs of peripherally grooved wheels 16, mounted upon shafts 17 which are journaled in bearings 18 on the truck. Each pair of wheels is arranged at one end of the truck, and the said wheels run upon a suitable track, to be later described, which is supported by the said wheels and the wheels 14—15 before mentioned.

Each of these tracks comprises an endless belt consisting of a series of links 19 which are pivotally connected at their ends, as indicated at 20, and it will be noted that each link consists of two sections which are channel shaped and arranged with their channels outward, the said sections being secured together in any suitable or desirable manner. The belts are supported by the wheels 14—15, and by the wheels 16, the latter wheels running upon the belt as it is laid by the ditching machine in its progress.

Rails or ties 21 are secured transversely of the endless belts in any suitable manner, the centers of the ties being at the belt, and it will be noted in Figs. 3 and 5 that one wall of each of the channel shaped sections of the links is of greater depth than the other. These wheels 22 are outward, and they run upon the disks 14 of the wheels 6, and upon the flanges of the wheels 16. The joint 7 before mentioned permits a limited movement of the truck sections with respect to each other, and the said connection or joint is formed, as shown in Fig. 4, by means of plates 24 secured to the opposite faces of the sections, the said plates extending beyond the adjacent ends of the sections and being pivotally connected at 7.

I claim:

1. In a ditching machine, a frame, and means at each side of the frame for supporting the same, each of the said means comprising a sectional truck, the sections being hinged together at their adjacent ends, supporting wheels journaled at the outer end of each section, endless chains supported by the wheels and having their lower runs beneath the truck, and load supporting wheels on the truck and running on the chains, each chain carrying transverse ties.

2. In a ditching machine, a frame, and means at each side of the frame for supporting the same, each of the said means comprising a sectional truck, the sections being hinged together at their adjacent ends, supporting wheels journaled at the outer end of each section, endless chains supported by the wheels and having their lower runs beneath the truck, and load supporting wheels on the truck and running on the chains.

3. In a ditching machine, a frame, and means at each side of the frame for supporting the same, each of the said means comprising a sectional truck, the sections being hinged together at their adjacent ends, supporting wheels journaled at the outer end of each section, load supporting wheels beneath the sections, and an endless chain supported by the supporting wheels upon which the load supporting wheels run.

THOMAS JEFFERSON JOYNER.